United States Patent
Grimes et al.

(10) Patent No.: US 7,607,721 B2
(45) Date of Patent: Oct. 27, 2009

(54) OPERATOR CAB TILTING APPARATUS

(75) Inventors: Joel R. Grimes, Fuquay-Varina, NC (US); Ian P. Goggins, Knightdale, NC (US); Alan R. Connor, Raleigh, NC (US); Michael S. Sekulich, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 254 days.

(21) Appl. No.: 11/594,466

(22) Filed: Nov. 8, 2006

(65) Prior Publication Data

US 2008/0106122 A1    May 8, 2008

(51) Int. Cl.
    *B62D 33/067*    (2006.01)
(52) U.S. Cl. .................................. 296/190.01
(58) Field of Classification Search ............ 296/190.01, 296/190.04, 190.05, 190.06, 190.07, 1.03
    See application file for complete search history.

(56) References Cited

U.S. PATENT DOCUMENTS

| | | | |
|---|---|---|---|
| 3,797,882 A * | 3/1974 | Brimhall ................ 296/190.06 |
| 3,831,999 A | 8/1974 | Sonneborn | |
| 3,944,017 A * | 3/1976 | Foster ..................... 180/89.15 |
| 4,053,178 A | 10/1977 | York et al. | |
| 4,372,411 A * | 2/1983 | Flower .................... 180/89.15 |
| 4,452,329 A * | 6/1984 | Stone et al. ............. 180/89.15 |
| 4,483,409 A * | 11/1984 | Fun ........................ 180/89.15 |
| 4,488,613 A * | 12/1984 | Marjoram ............... 180/89.15 |
| 4,556,118 A * | 12/1985 | London .................. 180/89.15 |
| 6,439,651 B1 * | 8/2002 | Johansson et al. ...... 296/190.07 |
| 2004/0119320 A1 * | 6/2004 | Albright et al. ........ 296/190.05 |
| 2006/0202515 A1 * | 9/2006 | Dickson et al. ........ 296/190.07 |
| 2006/0261640 A1 | 11/2006 | Mori et al. | |
| 2007/0267894 A1 * | 11/2007 | Van Den Brink et al. ..................... 296/190.07 |
| 2007/0278811 A1 * | 12/2007 | Derham et al. ............ 296/35.1 |

* cited by examiner

*Primary Examiner*—H Gutman
(74) *Attorney, Agent, or Firm*—Shital A. Shah (57) ABSTRACT

A vehicle includes a frame and an operator cab. At least one mounting assembly releasably mounts the cab to the frame. The mounting assembly is operable between a coupled position such that the cab is mounted on the frame, and an uncoupled position such that the cab is permitted to be moved relative to the frame. At least one hinge assembly releasably pivotally connects to the frame and the cab. The hinge assembly is operable between a connected position such that the cab is pivotally connected to the frame, and an unconnected position such that the cab is pivotally unconnected to the frame. The hinge assembly cannot be placed in the connected position when the mounting assembly is in the coupled position.

18 Claims, 7 Drawing Sheets

OPERATOR CAB TILTING APPARATUS

TECHNICAL FIELD

This disclosure relates generally to tilting mechanisms, and more particularly to a tilting mechanism for a pivotally mounted vehicle operator cab for vehicles.

BACKGROUND

Operator platforms and cabs for vehicle such as trucks, earthmoving vehicles, and the like are often mounted directly over the engine, transmission, hydraulic system, and other vehicle components. To permit access to these areas for servicing or repairs, operator cabs are often pivotally mounted on the vehicle frame to facilitate raising the cab from a substantially horizontal operating position to an upwardly tilted position exposing the vehicle components.

Operator platforms and/or cabs on earthmoving equipment are also typically equipped with roll-over protective structures (ROPS) or roll bars generally enclosing the operator platform. The ROPS may also include removable enclosure panels mounted on the ROPS forming compartments for the protection of the operator and the controls against the weather. To obtain sufficient exposure of the vehicle components, it is often necessary to raise or tilt the compartment and platform, or cab unit, past an overcenter position where the center of gravity of the compartment is located directly over the pivot axis.

In the past, hydraulic actuating systems or mechanically operated jacks have been employed to tilt pivotally mounted operator cabs. Prior art systems of this type are disclosed in U.S. Pat. No. 3,831,999 issued to Sonneborn, and U.S. Pat. No. 4,053,178 issued to York et al. While such tilting mechanisms have gained wide acceptance, they are subject to certain limitations. For example, the nature of the hydraulic system of the vehicle is such that fluid trapped in certain parts of the system prevents motion in one or both directions of the actuator, which interferes with the vehicle suspension. Thus, a more complicated and costly suspension system is required to overcome this problem.

Other cab tilting mechanisms are also known. One known prior art cab tilting mechanism includes a cab which is normally mounted to the vehicle by a plurality of mounting structures which include threaded fasteners or mounting bolts. The mounting bolts permit the cab to be releasably mounted on the vehicle frame. The mounting structures also include rubber isolation mounts to isolate vibration transmitted to the cab. The hinge structure includes a first hinge member hingedly connected to a second hinge member. The first hinge member is permanently mounted on the frame of the vehicle. The second hinge member is permanently mounted on the cab of the vehicle. To tilt the cab, the mounting bolts of the mounting structures are first removed. Once the mounting bolts are removed, the cab can then be tilted, such as for example, to permit access to areas underneath the cab. Although this type of mounting permits the cab to be tilted to vehicle frame, forces acting on the cab, such as from a rollover or other types of impacts, can bend or otherwise damage the hinge structure, thereby affecting the operation of the hinge members and detrimentally affecting the cab and vehicle frame mounting structures.

The foregoing illustrates limitations of the known prior art. Thus, it is apparent that it would be advantageous to provide an alternative to the prior art in the form of a releasable operator cab tilting apparatus.

SUMMARY OF THE INVENTION

In one aspect, a vehicle includes a frame and an operator cab. At least one mounting assembly releasably mounts the cab to the frame. The mounting assembly is operable between a coupled position such that the cab is mounted on the frame, and an uncoupled position such that the cab is permitted to be moved relative to the frame. At least one hinge assembly releasably pivotally connects to the frame and the cab. The hinge assembly is operable between a connected position such that the cab is pivotally connected to the frame, and an unconnected position such that the cab is pivotally unconnected to the frame. The hinge assembly cannot be placed in the connected position when the mounting assembly is in the coupled position.

DETAILED DESCRIPTION

Figure 1:
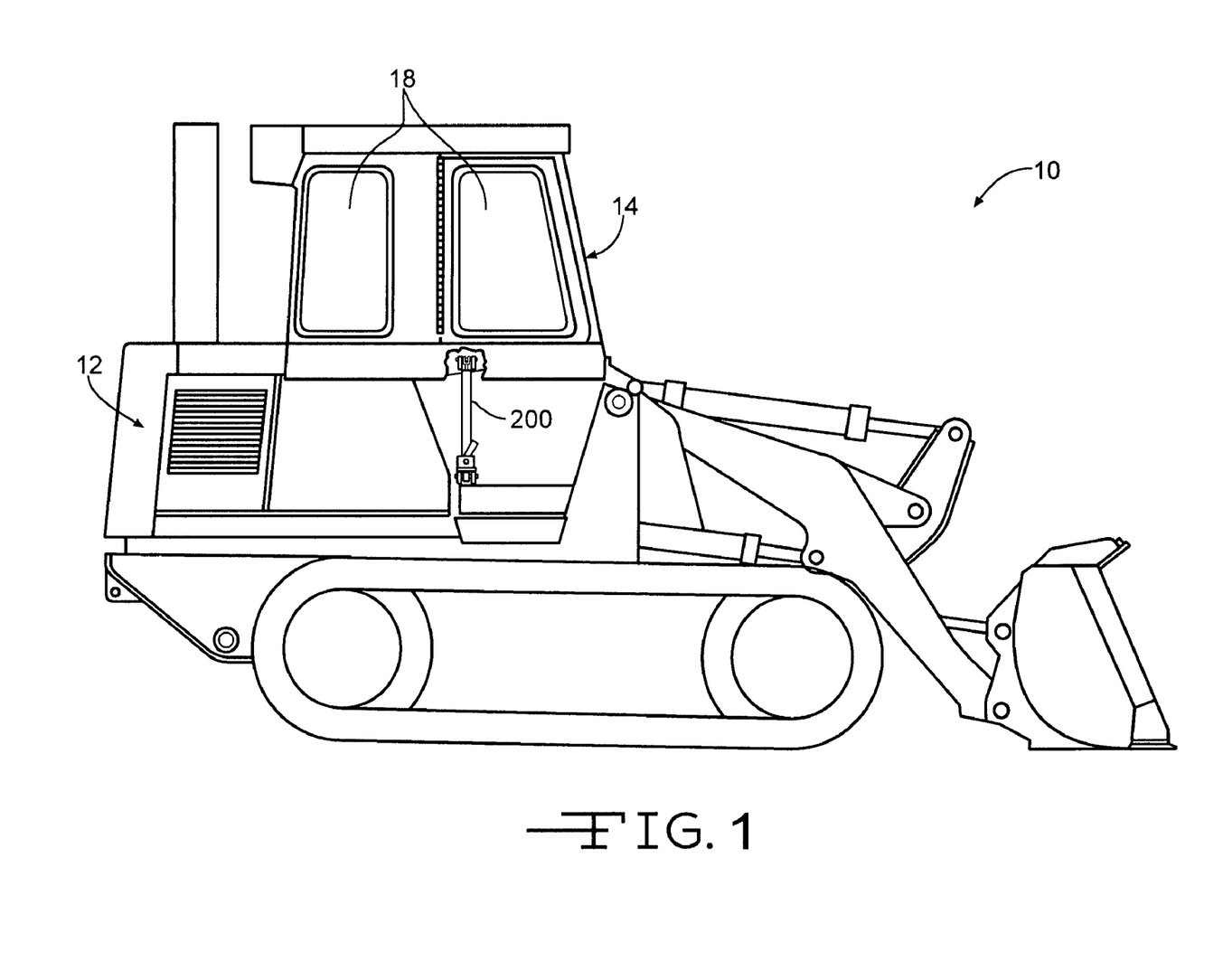
FIG. 1 is a schematic side elevation view of an earthmoving vehicle having an operator cab that is movably mounted relative to a vehicle frame by mounting assemblies and hinge assemblies.
Figure 2:
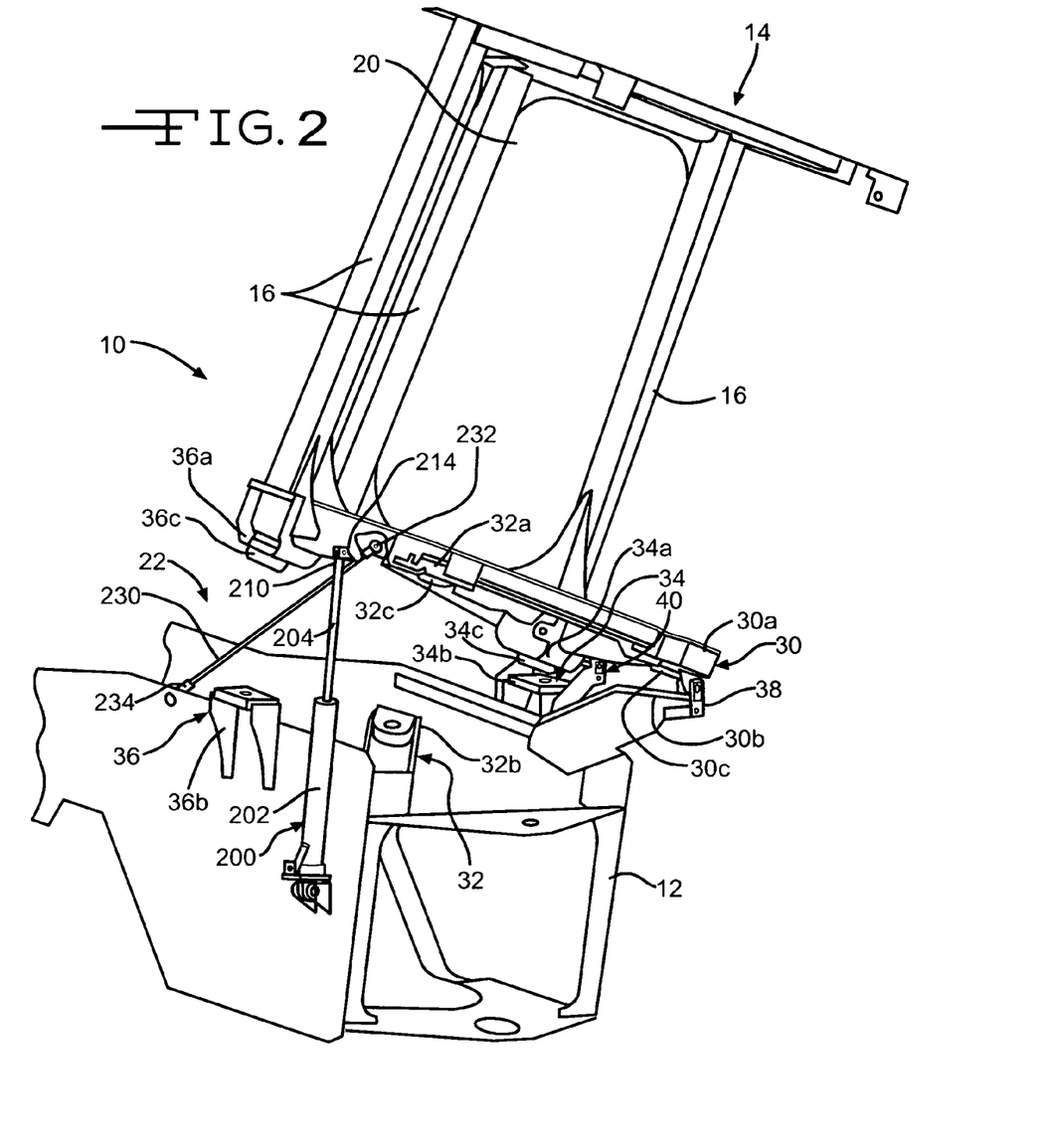
FIG. 2 is a schematic perspective view of the cab and frame of the vehicle of FIG. 1 with portion thereof removed, wherein the cab is shown in its tilted position.

There is illustrated in FIGS. 1 and 2, a mobile machine or an earthmoving vehicle 10. The vehicle 10 generally includes a vehicle frame 12 and an operator cab 14 mounted thereupon. The cab 14 is formed from a plurality of frame members 16 forming a roll-over protection structure (ROPS). A plurality of enclosure panels 18 may be mounted on the frame members 16 to define an operator compartment 20. As will be explained in detail below, the vehicle 10 includes mounting and hinge assemblies for movably mounting the cab 14 relative to the frame 12 in accordance with this disclosure. The cab 14 is movable to a tilted position to permit access to an area 22 beneath the cab 14. Such access is often necessary, for example, to perform maintenance and repair on engine and drivetrain components (not shown) of the vehicle 10. The cab 14 is shown in a normal use position in FIG. 1, and shown in a tilted position in FIG. 2. When in the tilted position, lower portions of the cab 14 are spaced from the frame 12 to permit access to the area 22. It should be understood that the illustrated vehicle 10 is shown as an example only, and that any suitable mobile machine or vehicle having an operator cab movably mounted on a frame may be used in cooperation with the described embodiments.

Figure 3:
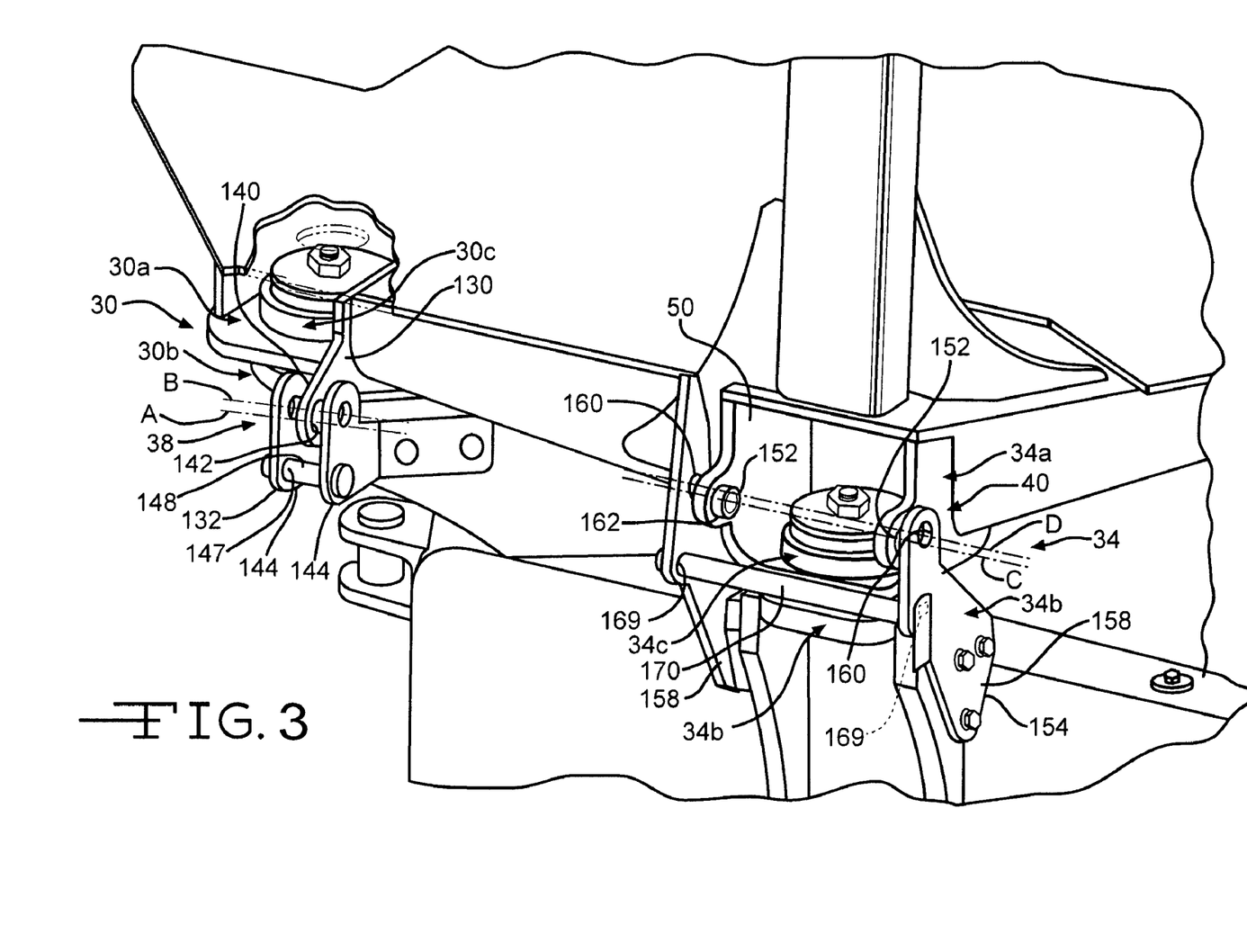
FIG. 3 is an enlarged perspective view of a pair of mounting assemblies shown in their coupled positions, and illustrating a pair of hinge assemblies shown in their unconnected positions.
Figure 4:
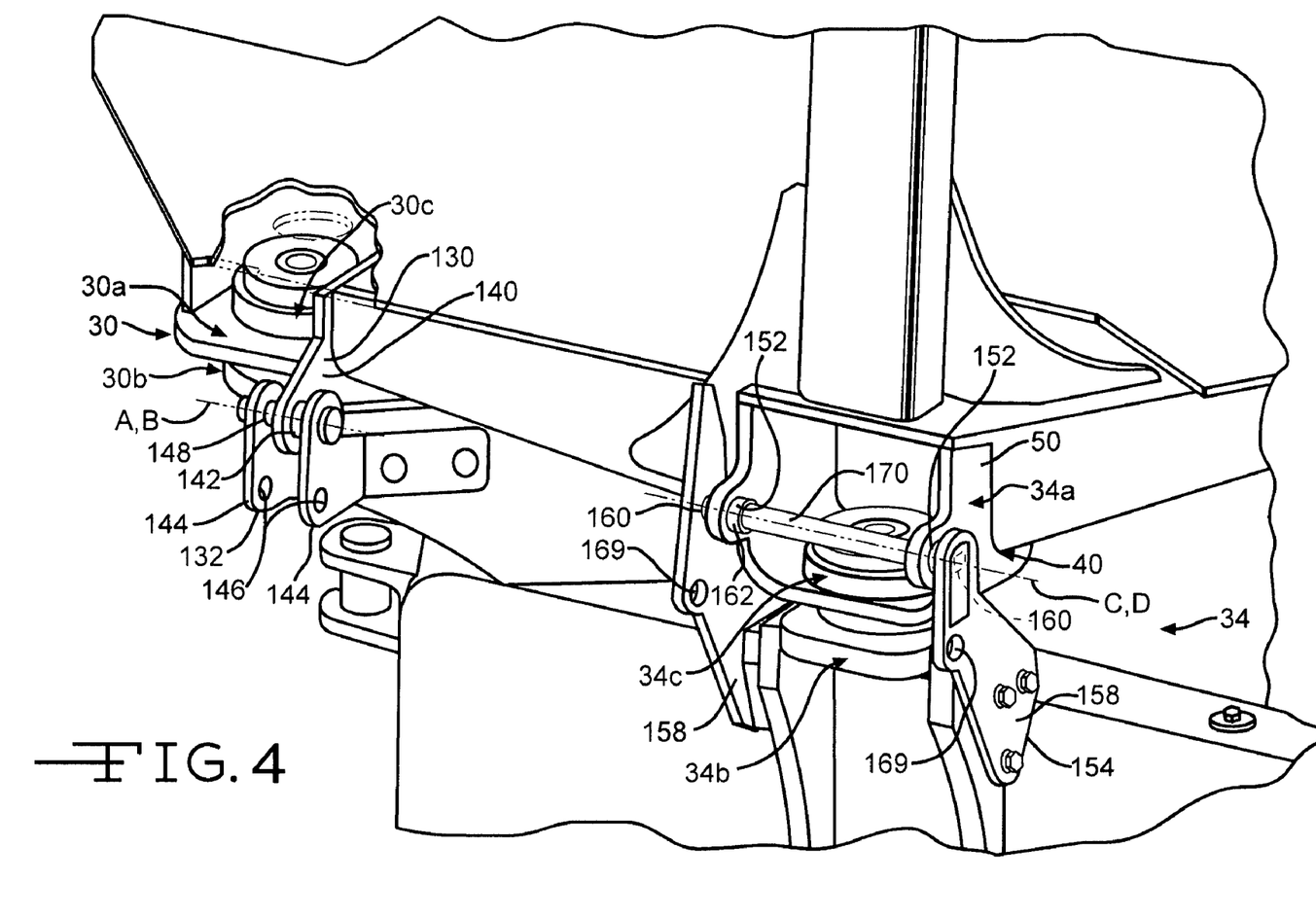
FIG. 4 is an enlarged perspective view of the pair of mounting and hinge assemblies of FIG. 3, wherein the mounting assemblies are shown in their uncoupled positions, and the hinge assemblies are shown in their connected positions.

The cab 14 is mounted on the frame 12 by a plurality of mounting assemblies. As best shown in FIGS. 2 through 4, the illustrated vehicle 10 includes a pair of front mounting assemblies 30 and 32 and a pair of rear mounting assemblies 34 and 36. The vehicle 10 further includes a front hinge assembly 38 and a rear hinge assembly 40. The front mounting assemblies 30, 32, and rear mounting assemblies 34, 36 releasably mount the cab 14 to the frame 12. As will be described below, the front mounting assemblies 30, 32 and rear mounting assemblies 34, 36 are operable between a coupled position to mount the cab 14 onto the frame 12 preventing movement therebetween, and an uncoupled position to permit the cab 14 to be tilted relative to the frame 12. In the embodiment of the vehicle 10 illustrated in the accompanying drawings, there are four mounting assemblies. However, it should be understood that the cab 14 could be releasably mounted on the frame 12 by any suitable number of mounting assemblies.

Illustrated in FIGS. 3 and 4 is an enlarged view of one of the front mounting assemblies 30 and rear mounting assemblies 34. Also shown are the front hinge assemblies 38 and the rear hinge assembly 40. Although it is not required, the front hinge assembly 38 is generally located adjacent the mounting assembly 30, and the rear hinge assembly 40 is generally located adjacent the mounting assembly 34. Each of the mounting assemblies 30, 32, 34, and 36 includes an upper portion 30a, 32a, 34a, and 36a, respectively. The upper portions 30a, 32a, 34a, and 36a are fixedly attached to the cab 14. The upper portions 30a, 32a, 34a, and 36a may be formed from various plates and members that are welded or otherwise attached to the cab 14. Each of the mounting assemblies 30, 32, 34, and 36 also include lower portions 30b, 32b, 34b, and 36b, respectively. Similarly, the lower portions 30b, 32b, 34b, and 36b may be formed from various plates and members that are welded or otherwise attached to the cab 14. Disposed between each upper and lower portion is at least one isolation mount 30c, 32c, 34c, and 36c. The isolation mounts 30c, 32c, 34c, and 36c are made of an elastomeric material. To place the mounting assemblies 30, 32, 34, and 36 in their coupled positions, the upper portions 30a, 32a, 34a, 36a, and lower portions 30b, 32b, 34b, and 36b are clamped or held together such that the isolation mounts 30c, 32c, 34c, and 36c are disposed therebetween. The upper portions 30a, 32a, 34a, 36a, and lower portions 30b, 32b, 34b, and 36b can be releasably clamped or held together by any suitable fastener mechanism, such as by threaded fasteners. The isolation mounts 30c, 32c, 34c, and 36c are compliant and deformable such that they permit limited movement of the cab 14 relative to the frame 12 when the mounting assemblies are in their coupled positions. This limited movement and compressibility of the isolation mounts 30c, 32c, 34c, and 36c can help reduce vibrations or other forces that might be transmitted to the cab 14.

Figure 5:
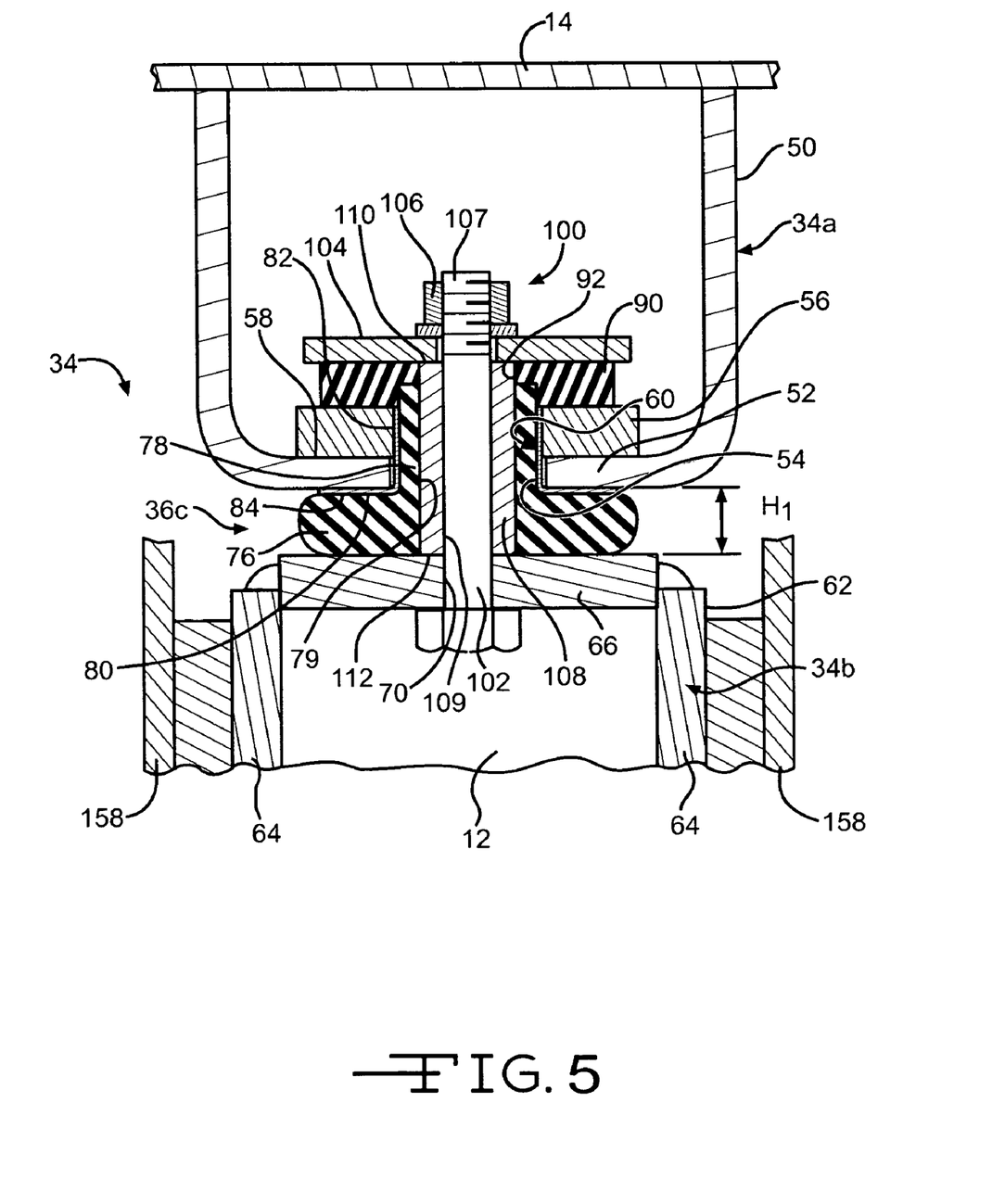
FIG. 5 is an enlarged sectional view of a mounting assembly shown in its coupled position.

Illustrated in FIG. 5, an enlarged view of the illustrated embodiment of the mounting assembly 34. The other mounting assemblies 30, 32, and 36 may include similar features as the illustrated mounting assembly 34. The upper portion 34a includes an inverted U-shaped mounting bracket 50 attached to the cab 14. The bracket 50 includes a bottom portion 52 having a generally planar shape when the mounting assembly 34 is in its coupled position. The bottom portion 52 includes an opening 54 formed therethrough. A socket 56 is mounted on an upper surface 58 of the bottom portion 52. The socket 56 is permanently attached to the bracket 50 by welding or some other similar mechanism. The socket 56 includes an opening 60 formed therethrough that is substantially coaxially aligned with the opening 54 of the bottom portion 52.

The lower portion 34b of the mounting assembly 34 includes a bracket 62 that is directly attached to the frame 12. The bracket 62 includes a pair of side plate members 64 attached to the frame 12. A generally planar plate 66 extends between the plate members 64. The plate members 64 and the plate 66 are permanently attached to the frame 12 such as by a weld. The plate 66 includes an opening 70 formed therethrough. The opening 70 is preferably coaxially aligned with the openings 54 and 60.

The isolation mount 34c includes an enlarged bottom portion 76 and an integrally formed tubular portion 78 extending upwardly from the bottom portion 76. The bottom portion 76 and the tubular potion 78 are made of an elastomeric material, such as rubber. The tubular portion 78 includes an opening 79 formed therethrough. The tubular portion 78 is received in the openings 54 and 60 of the bracket 50. The isolation mount 34c may include a sleeve 80 molded onto the bottom portion 76 and the tubular portion 78. The sleeve 80 includes a tubular portion 82 disposed over the tubular portion 78. The sleeve 80 includes a flange portion 84 extending radially outwardly from a bottom edge of the tubular portion 78. The flange portion 84 is positioned adjacent the bottom portion 52 of the bracket 50. The sleeve 80 may be made of a rigid material and generally provides support for the elastomeric portions of the isolation mount 34c when exposed to compressive forces. The isolation mount 34c may also include an upper portion 90 made of an elastomeric material. The upper portion 90 includes an opening 92 formed therethrough. The upper portion 90 is disposed over the socket 56 of the bracket 50.

As shown in FIG. 5, the mounting assembly 34 further includes a fastener assembly 100 for releasably clamping the bracket 50 and 62 together, thereby releasably attaching the cab 14 to the frame 12. The fastener assembly 100 includes a bolt 102 extending through the openings 54, 60, 70, 79, and 92. The fastener assembly 100 further includes a washer 104 and a nut 106 threadably engaged with a threaded portion 107 of the bolt 102. The washer 104 is disposed above the upper portion 90 of the isolation mount 34c. A spacer sleeve 108 is disposed over the bolt 102 such that the bolt 102 is received in a passageway 109 formed through the sleeve 108. An upper end 110 of the spacer sleeve 108 abuts against the washer 104. A lower end 112 abuts against the plate 66 of the lower bracket 62.

Figure 6:
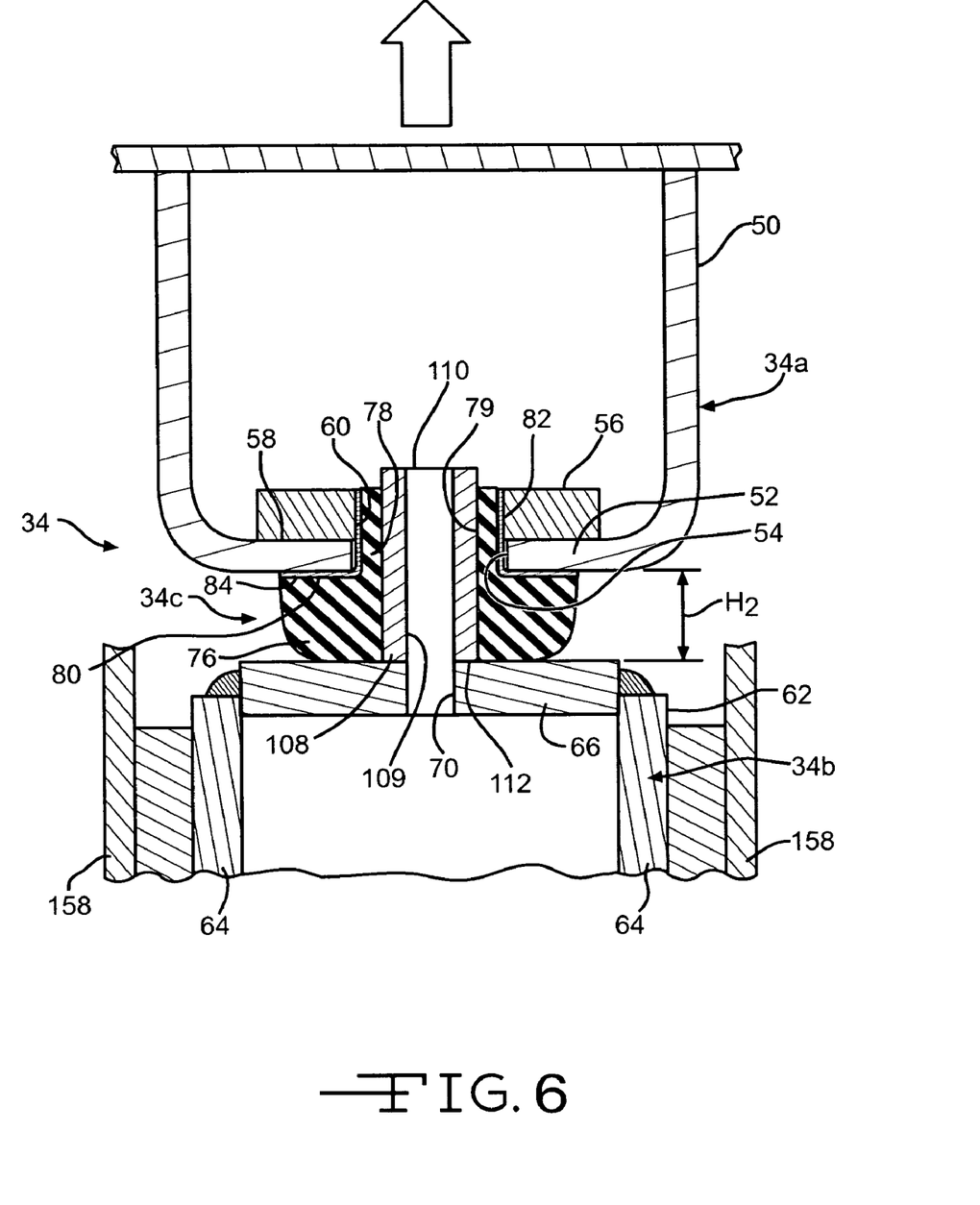
FIG. 6 is an enlarged sectional view the mounting assembly of FIG. 5 shown in its uncoupled position.

As stated above, the mounting assembly 34 (and optionally the other mounting assemblies 30, 32, and 36) is operable between a coupled position as shown in FIG. 5, and an uncoupled position as shown in FIG. 6. In the coupled position, the nut 106 is tightened on the bolt 102 to compress the isolation mount 34c until the upper end 110 of the spacer sleeve 108 abuts the washer 104, and the lower end 112 abuts the plate 66. Thus, the spacer sleeve 108 functions as a spacer to prevent over compression of the isolation mount 34c. In the coupled position, the bottom portion 76 is compressed and has a height H1 between the upper bracket 50 and the lower bracket 62. To move the mounting assembly 34 to the uncoupled position, the nut 106 is loosened from threaded portion 107 of the bolt 102. The nut 106, the washer 104 and the upper portion 90 of the isolation mount 34c can then be removed. Upon loosening and removal of the nut 106, the bottom portion 76 of the isolation mount 34c expands to a height H2 when it is in its uncoupled position, as shown in FIG. 6. When all of the mounting assemblies 30, 32, 34, and 36 are placed in their uncoupled position, the cab 14 can then be tilted upward from the frame 12.

Referring again to FIGS. 3 and 4, the front hinge assembly 38 includes an upper bracket 130 attached to the cab 14, and a lower bracket 132 attached to the frame 12. In the embodiment shown, the upper bracket includes an arm 140 having an opening 142 formed therethrough. The opening 142 defines an axis A. The lower bracket 132 includes a pair of spaced apart arms 144 having coaxially aligned openings 146 formed therein. The openings define an axis B. The arm 140 of the upper bracket 130 is disposed between the pair of arms 144 of the lower bracket 132. The lower bracket 132 further includes openings 147 formed therethrough, as shown in FIG. 4. The front hinge assembly 38 further includes a pivot pin 148. As shown in FIG. 3, the front hinge assembly 38 is shown in an unconnected position, such that the pivot pin 148 is not positioned within the openings 146 and 147 of the brackets 130 and 132. Instead, the pivot pin 148 is shown positioned within the openings 147 of the lower bracket which function as a storage position for the pivot pin 148. The front hinge assembly 38 is operable to a connected position, in which the pivot pin 148 is moved from out of the storage position and into the openings 146 and 147, thereby providing a pivoting connection between the upper and lower brackets 130 and 132.

The rear hinge assembly 40 includes an upper bracket defined by the upper bracket 50 of the mounting assembly 34. The upper bracket 50 includes a pair of coaxially aligned openings 152 formed therethrough. The openings 152 define an axis C. The rear hinge assembly 40 further includes a lower bracket 154. A pair of hinge plates 158 defines the lower bracket 154. The hinge plates 158 are adjustably mounted on the frame 12, such as by being fastened to the side plate members 64 of the mounting assembly 34. The hinge plates 158 include coaxially aligned openings 160 formed therethrough that define an axis D. By being adjustably mounted, the hinge plates 158 can be moved relative to the side plate members 64 to align the openings 152 and 160 if required over time, such as by changes in the resiliency of the isolation mount 34c. Bushing sleeves 162 may be optionally inserted into the openings 160. The hinge plates further include coaxially aligned openings 169. The rear hinge assembly 40 further includes a pivot pin 170. As shown in FIG. 3, the rear hinge assembly 40 is shown in an unconnected position, such that the pivot pin 170 is not positioned within the openings 152 and 160 of the brackets 50 and 154. Instead, the pivot pin 170 is shown positioned within the openings 169 of the lower bracket 154 which function as a storage position for the pivot pin 170. The rear hinge assembly 40 is operable to a connected position, in which the pivot pin 170 is moved from out of the storage position and into the openings 152 and 160, thereby providing a pivoting connection between the upper and lower brackets 50 and 154. It should be understood that the hinge assemblies 38 and 40 can have suitable shape other than that shown and disclosed herein which releasably pivotally connects the cab 14 to the frame 12.

As shown in FIGS. 1 and 2, the vehicle 10 further includes an actuator, indicated generally at 200. The actuator 200 can be any mechanism that is capable of tilting the cab 14 relative to the frame 12. In the embodiment shown, the actuator 200 is in the form of a cylinder that can be hydraulically or pneumatically actuated. Other suitable actuators includes jacks, such as screw jacks or scissor type jacks which are manually operable or electrically powered.

Figure 7:
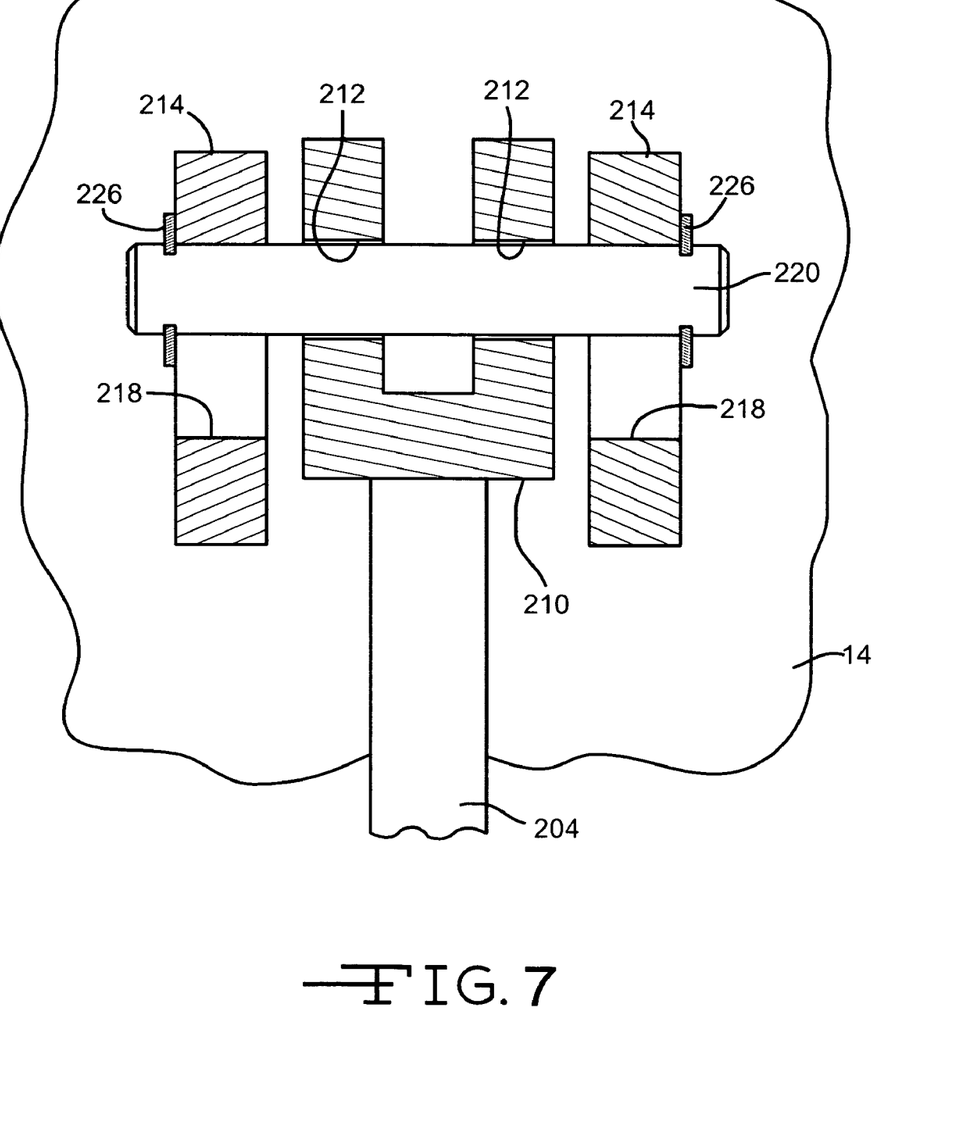
FIG. 7 is enlarged partial sectional view illustrating the connection between an arm of an actuator and the cab.

The cylinder includes a body 202 having an articulating arm 204 slidably mounted relative to the body 202. The body 202 is pivotally connected to the frame 12 at a pivot 206. An end 210 of the arm 204 is connected to the cab 14. As best shown in FIG. 7, the end 210 of the arm 204 includes a pair of coaxially aligned openings 212 formed therein. A pair of mounting brackets 214 are fixedly attached to the cab 14. The mounting brackets 214 include slots 218 formed therein. A pivot pin 220 extends through the openings 212 of the end 210 of the arm 204. The pivot pin 220 also extends through the slots 218 and engages with the mounting brackets 214 in a sliding manner. The pivot pin 220 may be retained on the mounting brackets 214 by clips 226. The slots 218 provide limited movement between the actuator 200 and the cab 14 to provide clearance for the movement of the expanding isolation mounts 30c, 32c, 34c, and 36c, when the mounting assemblies are moved from their coupled to uncoupled positions.

The vehicle 10 can also includes a tether 230, as shown in FIG. 2. The tether 230 can be a flexible or rigid member having a first end 232 attached to cab 14 and a second end 234 attached to the frame 12. The tether 230 prevents the cab 14 from tilting beyond a predetermined angle relative to the frame 12.

INDUSTRIAL APPLICABILITY

In normal use, the cab 14 is in its upright position, as shown in FIG. 1, such that the mounting assemblies 30, 32, 24, and 36 are in their coupled positions, and the hinge assemblies 38 and 40 are in their unconnected positions. Prior to lifting or raising the cab 14, such as for example, to obtain access into the area 22, the cab 14 is first locked into its forwarded position, such as by installing an articulation lock (not shown), thereby locking out the vehicle 10. Preferably, the battery (not shown) is electrically disconnected and the operating key (not shown) is removed. It is noted that when the mounting assemblies are in their coupled positions, the axis A is misaligned from the axis B. Similarly, the axis C is misaligned from the axis D. Therefore, when the mounting assemblies are in their coupled positions, the pins 148 and 170 cannot be inserted into the respective openings defining the axes A, B, C, and D, and thus the hinge assemblies cannot be placed in their connected positions. Additionally, any forces transmitted between the cab 14 and the frame 12 are not transmitted through the hinge assemblies 38 and 40 but only through the mounting assemblies 30, 32, 34, and 36. According to regulations, the fixed mounting assemblies 30, 32, 34, and 36 comprise ROPS loading structures, whereas hinge assemblies may not meet such regulations. Therefore, according the embodiments described herein, the hinge assemblies can be implemented without adding to the costs and limitations that may be necessary should the hinge mechanisms have to pass ROPS testing standards since the hinge assemblies cannot be engaged while the mounting assemblies are engaged.

To lift the cab 14, the nuts 106 of the four mounting assemblies 30, 32, 34, and 36 are unthreaded, loosened and removed, thereby placing the mounting assemblies in their uncoupled positions. The washers 104, the bolts 102, and the upper portions 90 of the isolation mounts may also be removed. Upon loosening of the nuts 106 on the bolts 102, the elastomeric portions of the isolation mounts 30c, 32c, 34c, and 36c will expand from their compressed state, thereby lifting the cab 14 vertically a short distance as indicated by the arrow in FIG. 6. Specifically, the bottom portion 76 will expand from the height $H_1$ to the height $H_2$. Upon this expansion, the axis A will align with the axis B, and the axis C will align with the axis D. Note that during this slight vertical lifting of the cab 14, the pivot pin 220 of the actuator 200 is free to slide within the slots 218 as the mounting brackets 214 attached to the cab 14 are lifted upward. At this time, the hinge assemblies 38 and 40 can be placed in their connected positions by removing the pivot pins 148 and 170 from their storage positions and inserting them into the openings aligned with the respective axes A, B, C, and D. Safety clips may be used with the pivot pins 148 and 170 to prevent them from being inadvertently removed from the openings during lifting of the cab 14. Once the mounting assemblies 30, 32, 34, and 36 are in their uncoupled positions and the hinge assemblies 38 and 40 are in their connected positions, the actuator 200 can be operated to extend the arm 204 outwardly from the body 202, thereby lifting or tilting the cab 14. To lower the cab 14, the steps described are completed generally in the reverse order.

It should be understood that any mechanism which prevents the hinge assemblies from being placed in their connected position when the mounting assemblies are in their coupled positions could be used instead of the interactions of the embodiments of the mounting and hinge assemblies described above. As an example, instead of using the misalignment of the axes A, B, C, and D to prevent the hinge assemblies from being placed in their connected positions, the mounting assemblies and the hinge assemblies could be configured such that an interference configuration is utilized, wherein the pins of the hinge assemblies cannot physically be inserted into the proper pivot openings when the mounting bolts of the mounting assemblies are tightened.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A vehicle comprising:
    a frame;
    an operator cab;
    at least one mounting assembly releasably mounting the cab to the frame, wherein the mounting assembly is operable between a coupled position such that the cab is mounted on the frame, and an uncoupled position such that the cab is permitted to be moved relative to the frame; and
    at least one hinge assembly connected to the frame and the cab, the hinge assembly being operable between a connected position in which the cab is pivotally connected to the frame, and an unconnected position in which the cab is not pivotally connected to the frame, wherein the hinge assembly is configured to be placed in the connected position only when the mounting assembly is in the uncoupled position.

2. The vehicle defined in claim 1, wherein the mounting assembly is configured to be placed in the coupled position when the hinge assembly is in the unconnected position.

3. The vehicle defined in claim 1, wherein the mounting assembly includes an elastomeric mount that permits limited movement of the cab relative to the frame when the mounting assembly is in the coupled position for reducing vibration transmitted to the cab.

4. The vehicle defined in claim 3, wherein the mounting assembly includes a threaded fastener assembly for releasably attaching the cab to the frame.

5. The vehicle defined in claim 1, wherein the hinge assembly includes:
    a first member fastened to the cab;
    a second member fastened to the frame; and
    a pivot pin removably mounted on the first and second members, wherein removal of the pivot pin from between the first and second members places the hinge assembly in the unconnected position.

6. The vehicle defined in claim 5, wherein the first and second members include first and second openings, respectively, formed therein for receiving the pivot pin when the hinge assembly is in the connected position, and wherein the pivot pin is configured to be slidably removed from the first and second openings to place the hinge assembly in the unconnected position.

7. The vehicle defined in claim 5, wherein one of the first and second members are adjustably mounted on the respective cab and the frame.

8. The vehicle defined in claim 5, wherein one of the first and second members includes a storage structure for storing the pivot pin when not connected between the first and second members.

9. The vehicle defined in claim 8, wherein the storage structure is an opening for receiving the pivot pin.

10. The vehicle defined in claim 1, further including an actuator for tilting the cab relative to the frame when the hinge assembly is in the connected position.

11. The vehicle defined in claim 10, wherein the actuator is slidingly connected to one of the cab and the frame to provided limited movement between the actuator and the one of the cab and the frame.

12. The vehicle defined in claim 10, wherein the actuator is a hydraulic cylinder.

13. The vehicle defined in claim 1, further including a tether connected to the cab and frame for preventing the cab from tilting relative to the frame by a predetermined angle.

14. The vehicle defined in claim 1, wherein the cab includes a plurality of frame members and a plurality of enclosure panels defining an operator compartment.

15. A vehicle comprising:
    a frame;
    an operator cab;
    a plurality of mounting assemblies releasably mounting the cab to the frame, the mounting assemblies including:
        an elastomeric mount disposed between the cab and frame; and
        a threaded fastener assembly for releasably connecting the cab to the frame, wherein the threaded fastener assembly is operable between an unfastened position and a fastened position compressing the elastomeric mount; and
    at least one hinge assembly including:
        a first member fastened to the cab, the first member having a pair of first openings defining a first axis;
        a second member fastened to the frame, the second member having a pair of second openings defining a second axis; and
        a pivot pin removably mountable within the pairs of first and second openings providing a pivotal connection between the cab and the frame,
    wherein compression of the elastomeric mount when the threaded fastener is in the fastened position to mount the cab to the frame causes misalignment between the first and second axes such that the pivot pin cannot be placed between within the first and second openings.

16. A method of pivoting an operator cab of a vehicle relative to a frame of the vehicle comprising:
    providing the vehicle having the frame and an operator cab attached thereto;
    providing at least one mounting assembly including a first portion connected to the cab and a second portion connected to the frame;
    providing a first fastener configured to releasably secure the first portion of the mounting assembly and the second portion of the mounting assembly together such that the mounting assembly is configurable between a coupled position and an uncoupled position;
    providing at least one hinge assembly including a first portion connected to the frame and a second portion connected to the cab, wherein the first portion of the hinge assembly includes a first opening therethrough and the second portion of the hinge assembly includes a second opening therethrough, wherein the opening through the first portion of the hinge assembly is not aligned with the second opening through the second portion of the hinge assembly;

removing the fastener to configure the mounting assembly in an uncoupled position;

moving the first opening and the second opening into alignment;

inserting a pivot pin through the first opening and the second opening; and pivoting the operator cab relative to the frame.

17. The method defined in claim 16 further comprising:

an elastomeric mount disposed between the first portion of the mounting assembly and the second portion of the mounting assembly, wherein the step of removing the fastener to configure the mounting assembly in an uncoupled position causes the elastomeric mount to decompress thereby causing the first opening and the second opening to move into alignment.

18. The method defined in claim 17 wherein the fastener compresses the elastomeric mount when the mounting assembly is in a coupled position.

* * * * *